(12) United States Patent
Gibart

(10) Patent No.: US 7,117,048 B2
(45) Date of Patent: Oct. 3, 2006

(54) SAFETY CONTROLLER WITH SAFETY RESPONSE TIME MONITORING

(75) Inventor: Anthony Gerard Gibart, New Berlin, WI (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 562 days.

(21) Appl. No.: 10/675,475

(22) Filed: Sep. 30, 2003

(65) Prior Publication Data

US 2005/0081117 A1    Apr. 14, 2005

(51) Int. Cl.
G05B 9/02 (2006.01)
G05B 13/02 (2006.01)
G06F 19/00 (2006.01)
G08C 19/04 (2006.01)
G08C 19/10 (2006.01)

(52) U.S. Cl. .................. 700/79; 700/19; 700/21; 700/81; 700/177; 340/870.11; 340/870.15; 340/870.16; 702/184; 702/185; 702/190; 164/152; 164/153; 164/154.1; 123/359

(58) Field of Classification Search .................. 700/1, 700/19–20, 21, 23, 79–82, 177, 178; 340/870.11, 340/870.15, 870.16; 702/184, 185, 190; 164/152, 153, 154.1; 123/359

See application file for complete search history.

(56) References Cited

U.S. PATENT DOCUMENTS 5,422,551 A     6/1995  Takeda et al.
5,469,150 A *  11/1995  Sitte ........................... 340/3.42
5,689,161 A *  11/1997  Fugere et al. ................ 318/563
5,978,578 A *  11/1999  Azarya et al. ............... 717/100
6,549,034 B1 *  4/2003  Pietrzyk et al. ................ 326/38
6,631,476 B1   10/2003  Vandesteeg et al.
6,744,376 B1 *  6/2004  Pascalidis .............. 340/870.21
6,898,483 B1 *  5/2005  Wielebski et al. .......... 700/230
RE39,011 E *    3/2006  Horst et al. ............. 246/187 A
7,024,285 B1 *  4/2006  Saelens ...................... 700/283
2002/0010527 A1 * 1/2002 Wielebski et al. .......... 700/230
2003/0051053 A1   3/2003  Vasko et al.
2003/0051203 A1   3/2003  Vasko et al.
2003/0145120 A1   7/2003  Vasko et al.
2003/0208283 A1  11/2003  Vasko et al.
2004/0066313 A1 * 4/2004 Ong et al. ............. 340/870.11
2005/0011258 A1 * 1/2005 Gysling et al. ............... 73/195

FOREIGN PATENT DOCUMENTS

JP     10-238218     9/1998
JP     2002 257339   9/2002

* cited by examiner

Primary Examiner—Ramesh Patel
(74) Attorney, Agent, or Firm—Keith M. Baxter; R. Scott Speroff

(57) ABSTRACT

A safety controller having a total worst case propagation delay, exceeding the required propagation delay required by a safety process, may be used to control the safety process by monitoring actual delays in signal processing in the safety controller and moving to a safety state if a signal delay exceeds an amount less than the total worst case propagation delay.

30 Claims, 3 Drawing Sheets

SAFETY CONTROLLER WITH SAFETY RESPONSE TIME MONITORING

CROSS-REFERENCE TO RELATED APPLICATIONS

--

STATEMENT REGARDING FEDERALLY SPONSORED RESEARCH OR DEVELOPMENT

--

BACKGROUND OF THE INVENTION

The present invention relates to industrial controllers used for real-time control of industrial processes, and in particular to "high reliability" or "safety" industrial controllers appropriate for use in devices or with devices intended to protect human life and health.

Industrial controllers are special-purpose computers used in controlling industrial processes. Under the direction of a stored, controlled program, an industrial controller examines a series of inputs reflecting the status of the controlled process and changes a series of outputs controlling the industrial process. The inputs and outputs may be binary, that is, on or off, or analog, providing a value within a substantially continuous range. The inputs may be obtained from sensors attached to the controlled process, and the outputs may be signals to actuators on the controlled process.

"Safety systems" are systems intended to ensure the safety of humans working in the environment of an industrial process. Such systems may include the electronics associated with emergency-stop buttons, light curtains, and other machine lockouts. Traditionally, safety systems have been implemented by a set of redundant circuits separate from the industrial control system used to control the industrial process with which the safety system is associated. Such safety systems have been "hardwired" from switches and relays including specialized "safety relays" which provide comparison of redundant signals and internal checking of fault conditions such as welded or stuck contacts.

Hard-wired safety systems using duplicate wiring have proven cumbersome in practice, in part because of the difficulty of installing and connecting hardwired components and duplicate sets of wiring, particularly in complex control applications, and in part because of the difficulty of troubleshooting and maintaining a hard-wired system whose logic can be changed only by re-wiring.

For this reason, there has been considerable interest in developing industrial controllers that may implement safety systems using a program simulating the operation of the physical components in hard-wired safety systems. Industrial controllers are not only easier to program but may provide reduced installation costs by eliminating long runs of redundant wiring in favor of a high speed serial communication network and by providing improved troubleshooting capabilities. U.S. Patent application 60/373,592 filed Apr. 18, 2002; Ser. No. 10/034,387 filed Dec. 27, 2001; Ser. No. 09/667,145 filed Sep. 21, 2000; Ser. No. 09/666,438 filed Sep. 21, 2000; and Ser. No. 09/663,824 filed Sep. 18, 2000, assigned to the assignee of the present invention, describe the implementation of safety systems using industrial controller architectures, and are hereby incorporated by reference.

When an industrial controller is used to implement a safety process in lieu of hard-wired devices, it is important that the speed of propagation of safety signals through the components of the industrial controller is well characterized. Importantly, safety processes requiring response speeds that exceed those possible with the industrial controller, because of signal propagation delay, must be avoided.

The propagation delay of a given signal through an industrial controller will vary as a function of network loading, computational complexity, and other often unknown factors. For this reason, the propagation delay of an industrial controller is normally characterized by summing the worst-case delays of each of the components of the industrial controller in the signal chain from input circuit through processor to the output circuit. Each of these components may also have a watchdog timer ensuring that the delay at the component does not exceed this worst case delay value and notifying the user and entering a safety state should this restraint be violated by any given signal.

Worst-case delay values must be conservatively estimated and therefore, when they are added together, the total worst case delay is substantially longer than the typical propagation delay of the industrial controller. Further because there is some statistical independence in the actual propagation delays at the components, worst-case delays at some components, will typically be offset by lesser delays at other components. Nevertheless, a simple summing of worst-case delay values is used because actual propagation delay of a given signal is known only too late to avoid unsafe operation.

SUMMARY OF THE INVENTION

The present inventor has recognized that although the actual propagation delay of each signal cannot be known before the signal has arrived at the output circuits, the signal's current propagation time since inception can be determined and compared to a threshold value that may be set significantly beneath the sum of the worst-case propagation delays of the components. When the current propagation time exceeds this threshold, a safety state can be entered even before the signal has fully propagated. In this way, the industrial controller can be used for safety applications requiring higher speeds than would be suggested by the worst-case propagation delay of the industrial controller.

Specifically, the present invention provides a safety industrial controller receiving signals from electrical sensors on a safety process and providing signals to electrical actuators on the safety process. The safety industrial controller includes input circuits receiving input signals from sensors and transmitting them to logic circuitry before a first worst-case delay. Logic circuitry receives the input signals from the input circuits to create at least one output signal based on the input signals and transmits the output signal to an output circuit before a second worst case delay. Output circuitry receiving the output signal from the logic circuitry outputs the output signal to an actuator before a third worst case delay only if the time elapsed since the input circuits received at least one input signal is less than a predetermined time limit less than the sum of the first, second, and third worst case delays. Otherwise, the output circuit enters a predetermined safety state.

It is thus one object of the invention to provide a monitoring of ongoing propagation delay that may be used to permit an industrial controller to implement safety systems requiring a higher response speed than would be indicated by the industrial controller's worst case propagation delay.

The input circuit may repeatedly transmit the input signals to the logic circuitry at a predetermined period less than the predetermined time period, and the logic circuitry may create the output signal at a repetition rate triggered by the receipt of the input signals.

Thus, it is one object of the invention to provide a simple mechanism for monitoring the accumulating propagation delay in signals passing through the industrial controller by regularly repeating the input signal.

The input circuitry may include a time stamp means creating a time stamp indicating a time corresponding to the receiving of the input signals by the input circuits. The logic circuitry may include a means for associating the output signal with one time stamp of the input signals so received, and the output circuitry may provide an output signal to an actuator only when the output signal arrives at the output circuit before a time equal to a time stamp associated with a previous output signal plus a predetermined time limit.

Thus it is another object of the invention to provide a mechanism for determining accumulating propagation delay that can detect even slow increases in propagation delay.

The association of the output signal with one time stamp may, in a simple case, take the earliest time stamp of the input signal so received. Alternatively, the association may follow a user-defined time stamp function indicating which of the time stamps of the input signal is forwarded by the output signal.

It is thus another object of the invention to provide a method of propagating a time stamp through a complex control execution thread in which multiple time-stamped input signals become one time stamped output signal.

The worst-case delays may include network transmission times between input and logic circuits and output and logic circuits.

Thus it is another object of the invention to provide a monitoring of propagation delays that works with networked systems.

The predetermined time limit may be greater than the sum of average delays associated with the worst-case delays.

Thus it is another object of the invention to provide a mechanism which does not enter a safety state unnecessarily at slight variations in propagation delay time.

The input and output circuits may have synchronized clocks or may have asynchronous clocks and the input circuit may provide a value to the output circuit indicating an offset between the clocks of the input and output circuits. In this latter case, the predetermined time limit may take into account the offset value and any uncertainty in the offset value.

Thus it is another object of the invention to provide a simple method for use with synchronized clock systems but that also works with asynchronous clock systems of arbitrary precision.

These particular objects and advantages may apply to only some embodiments falling within the claims and thus do not define the scope of the invention.

DETAILED DESCRIPTION OF THE PREFERRED EMBODIMENT

"High reliability" and "safety" systems are those that guard against the propagation of erroneous data or signals by detecting error or fault conditions and signaling their occurrence and/or entering into a predetermined fault state. High reliability systems may be distinguished from high availability systems which attempt to remain operating after some level of failure. The present invention may be useful in both systems, however, and therefore, as used herein, high reliability and safety should not be considered to exclude high availability systems that provide safety operation.

Figure 1:
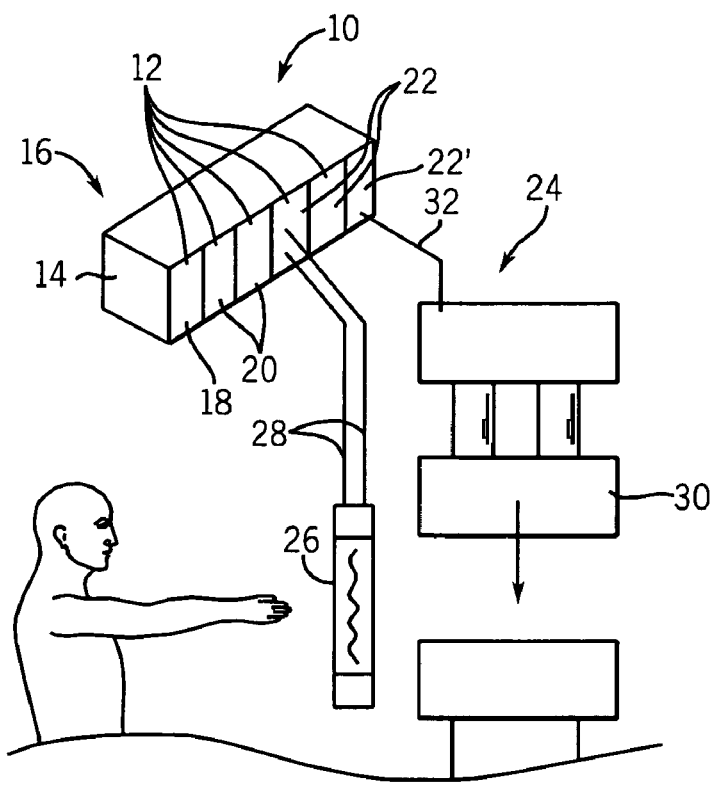
FIG. 1 is a simplified perspective view of a control system suitable for use with the present invention receiving redundant signals from a light curtain to lock operation of a press protected by the light curtain.

Referring now to FIG. 1, a safety controller 10 may include generally a plurality of modules 12 held in a rack 14 for intercommunication along a backplane 16, the backplane 16 providing an electrical channel of communication between the modules 12. Alternatively, the backplane may be any generalized serial communication network.

The modules 12 may include a power supply module 18 providing power to the other modules 12, one or more processor modules 20 providing logical processing of received signals according to control programs (not shown) executed by contained microprocessors, and input/output (I/O) modules 22 which may receive electrical signals from or transmit electrical signals to a safety process 24.

In a present example, the safety process 24 includes a light curtain 26 providing redundant light curtain signals 28 to an input I/O module 22 and a press 30 that may be stopped via halt signal 32 to the press 30 provided from output I/O module 22'. The safety process 24 is intended to stop the press 30 if the light curtain is broken. A speed of response of the safety controller 10 in halting the press 30 after breaking of the light curtain 26 determines the necessary amount of separation required between the light curtain 26 and the press 30. Large separation between the light curtain 26 and the press 30, necessitated by undue delay in the response of the safety controller 10, may hamper practical use of the press 30 must be avoided.

Figure 2:
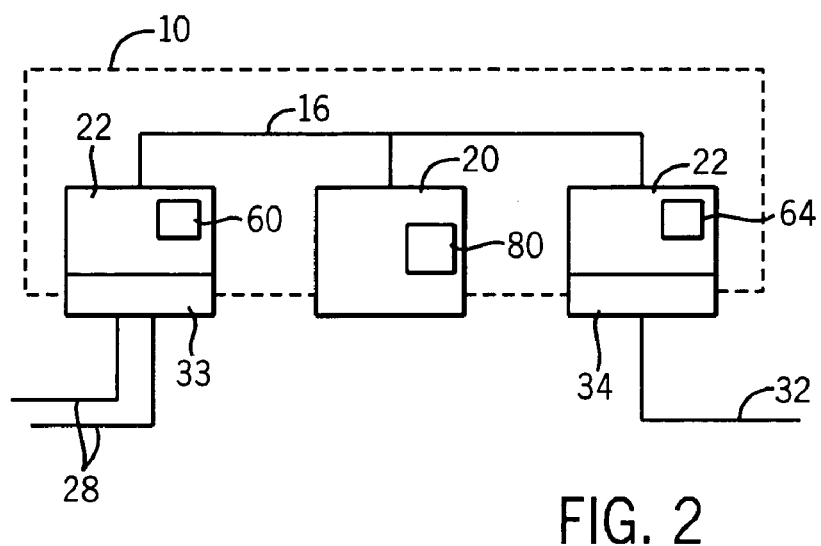
FIG. 2 is a block diagram of the components of the control system of FIG. 1 showing the redundant light curtain signals as received by input circuitry on an input module to be transmitted along a backplane to a logic module providing signals transmitted in turn along the backplane to an output module ultimately to be provided to an actuator on the press through output interface circuitry.
Figure 3:
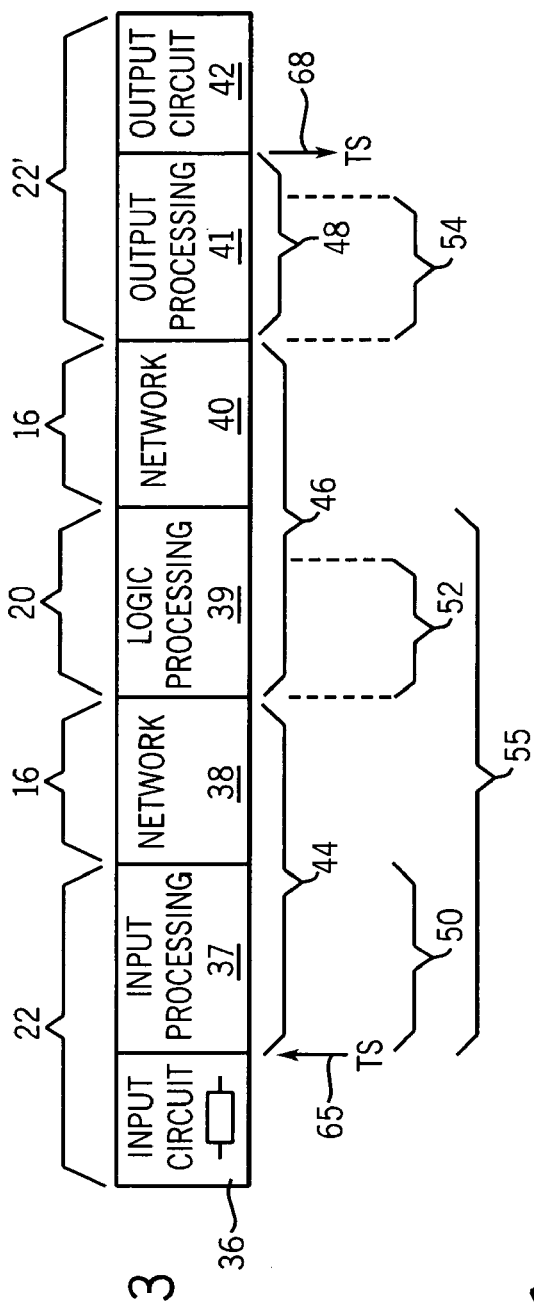
FIG. 3 is a representation of the signal path and components of FIG. 2 showing the definition of several worst case and average delays.

Referring now to FIGS. 2 and 3, the safety controller 10 receives redundant light curtain signals 28 (indicating that the light curtain 26 is broken) at input interface circuitry 33. The input interface circuitry provide for input filtering of these electrical signals to eliminate noise and the like, as is known in the art. This filtering introduces a slight input circuit delay 36 in the detection of the redundant light curtain signals 28 by the input I/O module 22. The input I/O module 22 may further contain processing circuitry that introduces additional input processing delay 37 into the processing of the redundant light curtain signals 28 including, for example, a coincidence detector detecting that the redundant light curtain signals 28 have both occurred essentially simultaneously.

Such coincidence circuitry must establish a window period during which each of the redundant light curtain signals must have a given logical state for coincidence to be detected. The window is sized to eliminate false anticoincidence detections caused by slight offset of the redundant light curtain signals 28 and this window period effectively introduces an additional delay into the signal processing.

The input I/O module 22 also has a network interface for communicating an input signal derived from the redundant light curtain signals 28 onto the backplane 16 to be received by one or more of the processor modules 20 such as provides a logic processing of the input signal. The backplane 16 and the necessary interface circuitry introduce a first network delay 38. In the present invention, an input signal will be transmitted from the input I/O module 22 repeatedly at a regular predetermined and known interval regardless of any change of state of the input signal.

Typically, the logic processing of the processor module 20 will logically combine multiple input signals to generate one or more output signals according to a stored control program. This logical combining of the processor module 20 introduces a logical processing delay 39 between receipt of the input signals by the processor module 20 and the generation of the output signals.

The output signals are again transmitted on the backplane 16 to the output I/O module 22' introducing a second network delay 40. The output signals are received by an output I/O module 22' which provides additional output processing delay 41 before providing electrical signals to output interface circuitry 34 which produces the halt signal 32 after an output circuit delay 42.

Referring to FIGS. 2 and 3, each of the delays 36, 37, 38, 39, 40, 41, and 42 may be given a worst case value, based on design and/or testing and the sum of these delays has previously been used to characterize the assured response time of the safety controller 10.

The worst case delays 37 and 38 will collectively be determined a first worst case delay 44, while the worst case delays 39 and 40 will be collectively termed a second worst case delay 46, and the worst case output processing delay 41 will be termed the third worst case delay 48.

Note generally that a first average delay 50 associated with worst case delays 37 and 38 will generally be shorter than the first worst case delay 44, a second average delay 52 associated with delays 39 and 40 will generally be shorter than the second worst case delay 46, and a third average delay 54 associated with output processing delay 41 will generally be shorter than worst case delay 48. A maximum propagation delay time 55 may then be selected being less than the sum of the first, second and third worst case delays 44, 46, and 48 but more than the sum of the first, second and third average delays 50, 52 and 54. Generally the period of the repetition rate of the input I/O modules 22 will much smaller than the maximum propagation delay time 55.

Figure 4:
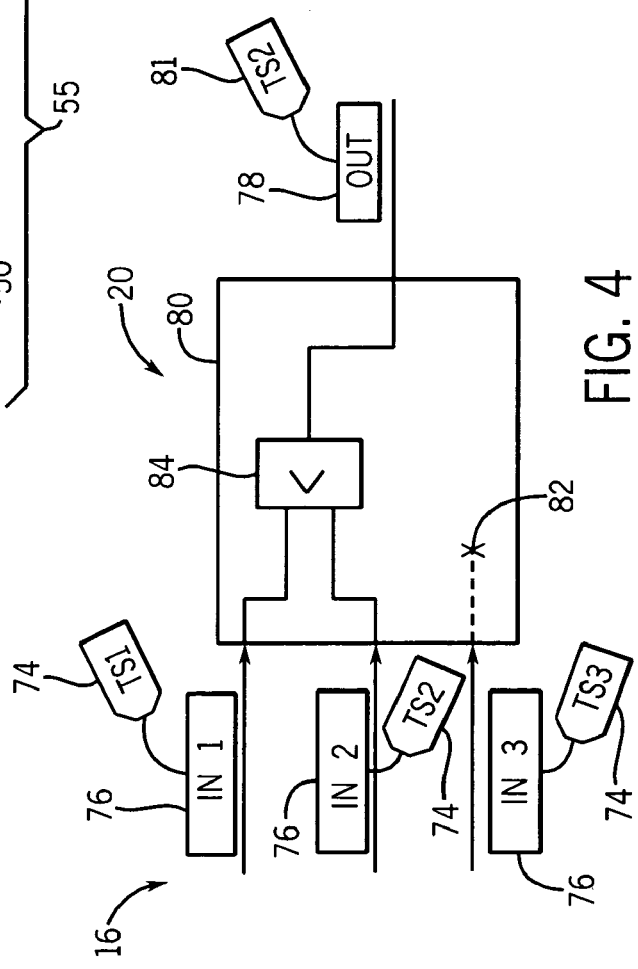
FIG. 4 is a schematic representation of the processing of input time stamps as implemented by the logic processor of FIG. 2 for associating a time stamp with an output signal generated from numerous input signals.

Referring to FIGS. 2, 3, and 4, the input I/O module 22 may include time stamp circuitry 60 determining a time 65 (shown in FIG. 3) when an input signal 76 (shown in FIG. 4) is received by the input I/O module 22 from the input interface circuitry 33 and attaching a time stamp 74 to that input signal 76. The time stamp 74 may be associated with serial digital representations of the input signals 76 transmitted on the backplane 16 as a header or trailer to the input signal 76 or as part of a multi-packet message including the input signal 76.

Referring to FIG. 4, during the processing of input signals 76, for example, such as may include redundant light curtain signals 28, a time stamp 74 will be attached to the input signals 76 forwarded to the processor module 20. As is generally understood in the art, the processor module 20 will effect a logical combination of multiple input signals 76 to produce one or more output signals 78. In the simplest case, the output signal 78 may be a Boolean combination of input signals 76 using AND, OR, NAND, NOR, and EXCLUSIVE OR operations.

In order to associate one of the time stamps 74 of the input signals 76 with the output signal 78, the processor module 20 may include a time stamp function 80 preprogrammed or programmed by the user to generate a time stamp 81 for the output signal 78.

In a simplest case, a preprogrammed set of rules may be applied to the time stamps 74 of the input signals 76 to select one of the times stamps 74 (TS1–TS3) of input signals 76 to be associated with the output signals 78 as its time stamp 81. Thus in the example of FIG. 4, three input signals 76, (IN1–IN3) may be used to produce an output signal 78 according to a functional relationship that is not shown. A simple rule may select the oldest (earliest) time stamp value TS2 of the input signals 76 as the time stamp 81.

Alternatively, a time stamp function 80 may be programmed by the user providing for more complex rules for determining the flow of time stamps. For example, as shown in FIG. 4, the user may program a rule that the lesser of time stamp TS1 and TS2 of input messages IN1 and IN2 are to be selected (per instruction 84) and that time stamp TS3 associated with input message IN3 is to be disregarded (per instruction 82). The time stamp function may exist in parallel with the control program that creates the output signal 78 from the input signals 76.

Figure 5:
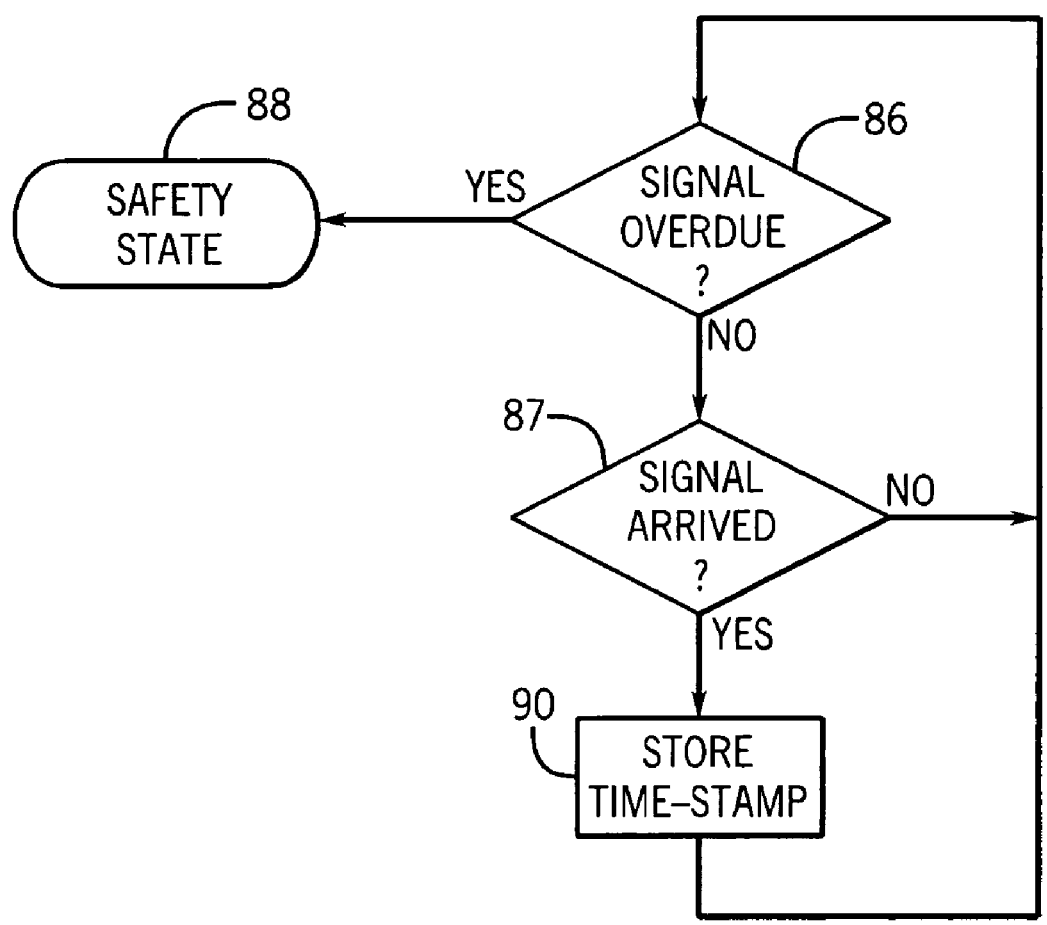
FIG. 5 is a flow chart of a program executed by the output circuit based on its receipt of safety signals.

Referring to FIGS. 2, 4, and 5, the output I/O module 22' may contain evaluation circuitry 64 that evaluates the time stamp 81 of a received output signal 78 to determine whether the safety controller 10 is working within its characterized propagation delay limits.

As shown in FIG. 5, the evaluation circuitry 64 monitors output signals 78 from the processor module 20 as indicated by decision block 86 to determine whether an output signal 78 is overdue based on the time stamp 74 of the previous output signal. Because the transmission of output signals 78 by the processor module 20 is triggered by the receipt of input signals 76 by the processor module 20, this determination of decision block 86 simply compares the current time to the time stamp 74 of the last output signal 78 plus the maximum propagation delay time 55 as has been described.

If this time has expired, then the program proceeds to safety state 88 at which the output I/O module 22' assumes a safety output value selected by the user to be a safe state for possible failure. In this case, the safety output would be that of disabling the press 30. Importantly, by making use of the known repetition time of the input signals 76, the output I/O module 22' may enter a safety state 88 even before or without actual communication from the input I/O module 22. The safety state 88 is entered before the maximum propagation delay time 55 has been exceeded and no additional signal paths for providing a monitoring of the passage of the input signals 76 by the output I/O module 22' is needed.

If at decision block 86, the output signal 78 is not overdue, then the program checks to see whether a message has arrived at process block 87. If not, the program loops back to process block 86.

If an output signal 78 has arrived at time 68, then as indicated by process block 90, the time stamp 74 of the output signal 78 is stored for use by process block 86 which is then returned to for the next signals overdue comparison as has been described.

The present invention has been described with respect to a system which provides for synchronized clocks at the input I/O module 22 and output I/O module 22'. It will be understood that synchronized clocks are not required so long as the output circuit has knowledge of the offset between the clocks of the input circuit and output circuit such as may be obtained within a predetermined accuracy by estimating offsets through a number of techniques, and subtracting the uncertainty in the offset from the predetermined time delay. For example, the input I/O module 22 and output I/O module 22' may exchange time stamped messages transmitted in both directions to net out constant propagation delay, this value may be averaged over time to yield a clock offset to a given tolerance. The clock offset may be used to synchronize the clocks of the input I/O module 22 and output I/O module 22' and the uncertainty in this correction subtracted from the maximum propagation delay time 55 to ensure the maximum propagation time is not exceeded because of errors between clocks.

Both circuitries 60 and 64 may be implemented as software routines within a microprocessor running on the respective input I/O module 22 and output I/O module 22' or may be implemented in discrete circuitry for gate arrays as is well known in the art, or other technique.

It is specifically intended that the present invention not be limited to the embodiments and illustrations contained herein, but include modified forms of those embodiments including portions of the embodiments and combinations of elements of different embodiments as come within the scope of the following claims.

I claim:

1. A safety industrial controller receiving signals from electrical sensors on a safety process and providing signals to electrical actuators on the safety process, the safety industrial controller comprising:
    input circuits receiving input signals from sensors and transmitting them to logic circuitry before a first worst-case delay;
    logic circuitry receiving the input signals from the input circuits to create at least one output signal based on the input signals and transmitted to an output circuit before a second worst case delay; and
    output circuit receiving the output signal from the logic circuitry to output the output signal to an actuator before a third worst case delay only if the time elapsed since the input circuits received at least one of the input signals is less than a predetermined time limit, the predetermined time limit being less than the sum of the first, second, and third worst case delays, and otherwise the output circuit entering a predetermined safety state.

2. The safety industrial control of claim 1:
    wherein the input circuits repeatedly transmit the input signals to the logic circuitry at a predetermined repetition period less than the predetermined time period and;
    wherein the logic circuitry creates the output signal at a repetition rate triggered by receipt of the input signals.

3. The safety industrial control of claim 1:
    wherein the input circuitry includes a time stamp means creating a time stamp indicating a time corresponding to the receiving of the input signals by the input circuits;
    wherein the logic circuitry includes means for associating the output signal with one time stamp of the input signals so received; and
    wherein the output circuitry includes means for providing an output signal to an actuator only when the output signal arrives at the output circuit before a time equal to a time stamp of a previous output signal plus a predetermined time limit.

4. The safety industrial controller of claim 3 wherein the input signals are redundant input signals and the time stamping means creates the time stamp when the redundant input signals have coincidence.

5. The safety industrial control of claim 3:
    wherein the input circuits repeatedly transmit the input signals to the logic circuitry at a predetermined repetition period less than the predetermined time period and;
    wherein the logic circuitry creates the output signal at a repetition rate triggered by receipt of the input signals.

6. The safety industrial control of claim 3 wherein the means for associating associates the earliest time stamp of the input signals with the output signal.

7. The safety industrial controller of claim 3 wherein means for associating follows a user defined time stamp function indicating which of the time stamps of the input signal is associated with the output signal.

8. The safety industrial controller of claim 3 wherein the input and output circuits have synchronized clocks.

9. The safety industrial controller of claim 3 wherein the input and output circuits have asynchronous clocks and wherein the input circuit provides a value to the output circuit indicating an offset between the clocks of the input and output circuits and wherein the predetermined time limit is the sum of a maximum allowable propagation delay plus the offset value minus an uncertainty in the offset value.

10. The safety industrial controller of claim 1 wherein the first worst case delay includes a time to transmit the input signals on an electrical medium connecting the input circuits to the logic circuit.

11. The safety industrial controller of claim 1 wherein the input circuit includes a filter and wherein the first worst-case delay includes a filter rise time.

12. The safety industrial controller of claim 1 wherein the second worst case delay includes a time to transmit the output signals on an electrical medium connecting the logic circuit to the output circuit.

13. The safety industrial controller of claim 1 wherein the safety state provides a safety output value determined by a user.

14. The safety industrial controller of claim 1 wherein the input circuits transmit the input signals to logic circuitry after a first average delay and the logic circuitry transmits the output signals to the output circuit after a second average delay, and the output circuit transmits the output signal to an actuator after a third average delay; and
    wherein the predetermined time limit is greater than a sum of the first, second, and third average delays.

15. The safety industrial controller of claim 1 wherein the output circuit is implemented with a processor executing a stored program.

16. The safety industrial controller of claim 1 wherein the output circuit is implemented with dedicated circuitry.

17. A method of operating a safety industrial controller receiving input signals from electrical sensors on a safety process at input circuits and transmitting the input signals to logic circuits to produce output signals transmitted in turn to output circuits and then to electrical actuators on the safety process, the method comprising the steps of:
    at the input circuitry, transmitting received input signals to logic circuitry before a first worst-case delay;

at the logic circuitry, creating at least one output signal based on the input signals and transmitting the output signals from the logic circuitry to an output circuit before a second worst case delay; and at the output circuitry, outputting the output signal to an actuator before a third worst case delay only if the time elapsed since the input circuits received at least one of the input signals is less than a predetermined time limit, the predetermined time limit being less than the sum of the first, second and third worst case delays, and otherwise the output circuit entering a predetermined safety state.

18. The method of claim 17 including the steps of:
the input circuits repeatedly transmitting the input signals to the logic circuitry at a predetermined repetition period less than the predetermined time period and;
the logic circuitry creating the output signal at a repetition rate triggered by receipt of the input signals.

19. The method of claim 17 including the steps of:
creating a time stamp indicating a time corresponding to the receiving of the input signals by the input circuits;
associating the output signal with one time stamp of the input signals so received; and
providing an output signal to an actuator only when the output signal arrives at the output circuit before a time equal to a time stamp associated with a previous output signal plus the predetermined time limit.

20. The method of claim 17 wherein the input signals are redundant input signals and the time stamp is when the redundant input signals have coincidence.

21. The safety industrial controller of claim 19 wherein the output signals are provided to an actuator only when the output signal arrives at the output circuit before a time equal to a time stamp associated with a previous output signal plus a first predetermined time limit and the output signal arrives at the output circuit before a time equal to a time of receipt of an immediately preceding output signal plus a second predetermined time limit.

22. The safety industrial controller of claim 19 and the time stamp of the input signals associated with the output signal is the earliest time stamp of the input signals so received.

23. The safety industrial controller of claim 19 wherein the time stamp associated with the output signal follows a user defined time stamp function indicating which of the time stamps of the input signal is forwarded by the output signal.

24. The method of claim 19 wherein the input and output circuits have synchronized clocks.

25. The method of claim 19 wherein the input and output circuits have asynchronous clocks and wherein the input circuit provides a value to the output circuit indicating an offset between the clocks of the input and output circuits and wherein the predetermined time limit is the sum of a maximum allowable propagation delay plus the offset value minus an uncertainty in the offset value.

26. The method of claim 17 wherein the first worst-case delay includes a time to transmit the input signals on an electrical channel connecting the input circuits to the logic circuit.

27. The method of claim 17 wherein input circuit includes a filter and wherein the first worst-case delay includes a filter rise time.

28. The method of claim 17 wherein the second worst-case delay includes a time to transmit the output signals on an electrical channel connecting the logic circuit to the output circuit.

29. The method of claim 17 wherein the safety state is an output determined by a user.

30. The method of claim 17 wherein the input circuits transmit the input signals to logic circuitry after a first average delay and the logic circuitry transmits the output signals to the output circuit after a second average delay, and the output circuit transmits the output signal to an actuator after a third average delay;
wherein the predetermined time limit is greater than a sum of the first, second, and third average delays.

* * * * *